United States Patent [19]

Wieczorek et al.

[11] Patent Number: 4,756,853
[45] Date of Patent: Jul. 12, 1988

[54] PROCESS FOR THE CONVERSION INTO USABLE CONDITION OF ACTINIDE IONS CONTAINED IN THE SOLID RESIDUE OF A SULFATE REPROCESSING PROCESS FOR ORGANIC, ACTINIDE-CONTAINING RADIOACTIVE SOLID WASTE

[75] Inventors: Herbert Wieczorek, Weingarten; Bernhard Oser, Karlsruhe, both of Fed. Rep. of Germany

[73] Assignee: Kernforschungszentrum Karlsruhe GmbH, Karlsruhe, Fed. Rep. of Germany

[21] Appl. No.: 736,622

[22] Filed: May 21, 1985

[30] Foreign Application Priority Data

May 22, 1984 [DE] Fed. Rep. of Germany ....... 3418986

[51] Int. Cl.$^4$ .............................................. G21F 9/00
[52] U.S. Cl. .................................... 252/626; 252/631; 423/18
[58] Field of Search .................... 423/18, 10; 252/626, 252/631

[56] References Cited

U.S. PATENT DOCUMENTS

| | | | |
|---|---|---|---|
| 3,957,676 | 5/1976 | Cooley et al. | 252/626 |
| 4,313,845 | 2/1982 | Cowan et al. | 252/626 |
| 4,349,465 | 9/1982 | King et al. | 252/627 |
| 4,442,071 | 4/1984 | Lieser et al. | 423/10 |
| 4,451,438 | 5/1984 | Floeter et al. | 423/18 |
| 4,591,488 | 5/1986 | Heckman et al. | 423/11 |
| 4,609,533 | 9/1986 | Heckman et al. | 423/18 |

FOREIGN PATENT DOCUMENTS 1211816  11/1970  United Kingdom .

OTHER PUBLICATIONS

White et al., "Research Disclosure No. 183", pp. 406-407, #18365.
Radioactive Waste Management, vol. 2, Int. Atomic Energy Agency, Vienna, 1984, No. IAEA-CN-43/44, pp. 335 to 346.
Reactor Handbook, 2nd Edition, vol. II, Fuel Reprocessing, Chapter 4, 1961, pp. 107-115, 154-155, and 231 to 234.

*Primary Examiner*—Edward A. Miller
*Attorney, Agent, or Firm*—Sughrue, Mion, Zinn, Macpeak, and Seas

[57] ABSTRACT

A process for the conversion into a usable condition of actinide ions contained in the solid residue of a sulfate reprocessing process for organic actinide-containing radioactive solid waste, which are present in the form of water soluble sulfato complexes. The residue is absorbed with water of 1 to 2 molar nitric acid so that the residue or the largest amount of residue goes in the solution. The resulting solution is separated from the insoluble constituents of the residue in case of any insoluble residue, and heated to a temperature in the range of 40° C. below the boiling point of the solution to form a hot solution. To the hot solution is added an aqueous barium nitrate solution having an amount of barium nitrate which corresponds to a small excess of barium ions over the amount required stoichiometrically for complete precipitation of the sulfate ions. The resulting reaction solution is held at a selected temperature in the same range as above for a period in the range of 0.5 to 2 hours. The reaction solution is subsequently cooled to room temperature and then is separated from the barium sulfate precipitate to form a sulfate free actinide-nitrate solution. The sulfate free actinide-nitrate solution obtained after the separation is fed to an extractive reprocessing process of exposed nuclear fuel-and/or fertile materials, the aqueous phases of which are nitric acidic.

4 Claims, No Drawings

PROCESS FOR THE CONVERSION INTO USABLE CONDITION OF ACTINIDE IONS CONTAINED IN THE SOLID RESIDUE OF A SULFATE REPROCESSING PROCESS FOR ORGANIC, ACTINIDE-CONTAINING RADIOACTIVE SOLID WASTE

BACKGROUND OF THE INVENTION

The present invention relates to a process for the conversion into a usable condition of actinide ions contained in the solid residue of a sulfate reprocessing process for organic, actinide-containing radioactive solid waste, which actinide ions together with cationic impurities are present in the solid residue in the form of water soluble sulfato complexes.

Among sulfate reprocessing processes for organic solid wastes are included such decomposition processes, as those by which the wastes are oxidatively decomposed in a sulfate- or bisulfate-melt at high temperatures, for example, at 800° C., as well as those by which the wastes are treated with comparatively highly concentrated sulfuric acid, for example, with 90%, or with concentrates $H_2SO_4$ (so-called wet incineration process).

Wet incineration processes are processes for the treatment of combustible, solid waste materials with sulfuric acid at raised temperature, by which simultaneously and/or afterwards the waste material exposed by the reaction is brought into contact with nitric acid or nitrogen dioxide. By this means, carbon-containing material is oxidized to non-combustible gas products and to a non-combustible residue having low volume. In the field of nuclear technology, especially in the field of the th reprocessing of exposed nuclear fuel- and/or fertile materials, such combustible solid wastes, which can be comprised, for example, of spent ion-exchange resin, paper, rubber gloves, synthetic parts of different materials, etc., contain radioactive materials, especially actinides, as, for example, uranium and plutonium. With regard to doing as little damage to the environment as possible by radioactive material, it is necessary that radioactive wastes of whatever type undergo as extensive a volume reduction as possible before solidification in a long term stable matrix and consequent final storage. Here it is desirable not only for an improved waste treatment but also for the reuse of certain valuable materials, such as, for example, actinides, to remove the actinides present in the waste, especially uranium and plutonium, before the solidification of the wastes.

One of the process methods useful for this is wet combustion, as described in a process variation example in German Published Patent Application No. 23 47 631, corresponding generally to U.S. Pat. No. 3,957,676. Here, the actinide compounds contained in the solid waste are converted by the hot sulfuric acid into sulfato complexes, which, because of their low solubility in the relatively concentrated sulfuric acid, precipitate and form a solid reaction residue with other constituents of the waste.

For subsequent treatment of solid residues containing actinide ions and sulfate ions of sulfate reprocessing processes for organic solid wastes, it is known for example to leach and wash this solid residue with diluted sulfuric acid, to treat the combined leaching and washing solutions with an organic extraction agent solution to transfer the actinides from the aqueous phase into the organic phase, to treat the organic phase charged with actinides with nitric acid for the re-extraction of actinides into the aqueous phase, thereafter to precipitate the actinides from the aqueous solution with, for example, oxalic acid, and to calcinate the precipitated oxalates or to dissolve them in $HNO_3$. See, Radioactive Waste Management, Volume 2, Int. Atomic Energy Agency, Vienna, 1984, No. IAEA-CN-43/44. pages 335 to 346.

In still another method for the subsequent treatment of the residue containing actinides with or without sulfate ions which residue was absorbed with water to form an aqueous solution, a process for the selective separation of plutonium and uranium can also be used, by which sulfuric acid is added to the aqueous solution containing $Pu^{4+}$ and $UO_2^{2+}$ in amounts such that the uranium forms anionic sulfato complexes, then a cationic surfactant is added to the solution to form a uranium containing precipitate, the resulting precipitate then is separated from its mother liquor in a known way; after separation of the uranium-containing precipitate, the pH value of remaining mother liquor is changed so that henceforth the $Pu^{4+}$ forms anionic sulfato complexes, then a cationic surfactant is added to form a plutonium containing precipitate, the resulting precipitate then is separated from its mother liquor in a known way, and the plutonium is recovered from the precipitate by means of calcination. See German Published Patent Application No. 32 24 803.

For all known processes, the final product is actinide dioxide. Depending on the separation method used, the actinide dioxide could contain residual amounts of sulfate ions or, if it was calcined at high temperatures, could be insoluble. But both of these disadvantages reduce the reuseability of the product of the process.

Moreover, with the use of this process the plutonium loss can reach, for example, up to 4 or 5 weight %, respectively. Furthermore, the known processes are relatively expensive regarding the handling and number of process steps.

SUMMARY OF THE INVENTION

An object of the present invention is to produce a simple process for the conversion of actinide ions contained in the solid residue of a sulfate reprocessing process for organic, actinide-containing radioactive solid waste in an extractive reprocessing process of exposed nuclear fuel- and/or fertile materials, the aqueous phases of which are nitric acidic, as, for example, in the Purex process, by which a high recovery of actinides is guaranteed without the danger of co-converting quantities of sulfate ion in the extractive reprocessing process, with the smallest possible expenditure of energy, time and apparatus.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for the conversion into a usable condition of actinide ions contained in the solid residue of a sulfate reprocessing process for organic, actinide-containing radioactive solid waste, which are present in the form of water soluble sulfato complexes, comprising (a) dissolving the solid residue with water or 1 to 2 molar nitric acid so that the residue or the largest amount of the residue goes into solution, (b) separating the resulting solution from the insoluble constituents of the residue in case of any insoluble residue, and heating the solution or the separated solution to a temperature in the range of 40° C. to below the boiling point of the solution to form a hot solution, (c) adding to the hot solution an aqueous barium nitrate solution having an amount of barium ions which corresponds to a small excess of barium ions over the amount required stoichiometrically for complete precipitation of the sulfate ions, holding the resulting reaction solution at a selected temperature in the same range as in step (b) for a period in the range of 0.5 to 2 hours to precipitate barium sulfate, (d) subsequently cooling the reaction solution to room temperature and then separating the reaction solution from the barium sulfate precipitate to form a sulfate free actinidenitrate solution, and (e) feeding the sulfate free actinide-nitrate solution obtained after the separation to an extractive reprocessing process of exposed nuclear fuel- and/or fertile materials, the aqueous phases of which are nitric acidic.

Largest amount of the residue means about 80 weight-% of the residue or more; this quantity depends on the amount of the insoluble materials in the sulfate reprocessing process.

When the solid residue contains several actinides, the sulfate free actinide-nitrate solution is fed into the aqueous phase before the uranium-plutonium- separation.

When the solid residue contains Pu, the sulfate free actinide-nitrate solution is fed into the aqueous phase before the first Pu-purification cycle.

When the solid residue contains U, the sulfate free actinide-nitrate solution is fed into the aqueous phase before the first U-purification cycle.

See the Reactor Handbook, 2nd Edition, Volume II, Fuel Reprocessing, Chapter 4, for a description of the uranium-plutonium separation, the first Pu purification cycle and the first U-purification cycle of the extractive reprocessing process, which chapter is hereby incorporated by reference.

It is to be understood that both the foregoing general description and the following detailed description are exemplary and explanatory, but are not restrictive of the invention.

DETAILED DESCRIPTION OF THE INVENTION

According to the origin and nature of the organic solid waste, it is possible for one or several actinides, as, for example, uranium, plutonium, neptunium, americium, etc., to be present in the solid residue sulfato complexes resulting during the sulfate reprocessing process. In the present invention, the solid residue is dissolved with water or with 1 to 2 molar nitric acid so that as much as possible of the residue goes into solution, about 80 weight-% of the residue or more; this quantity depends on the amount of the insoluble materials in the sulfate reprocessing process. The dissolving of the residue by water or nitric acid and the leaching of the sulfato complexes which occurs during dissolving preferably is accomplished by employing about 1 liter water, or 1 liter of 1 to 2 molar nitric acid, respectively, per 100 to 250 g of residue.

The solution resulting from the dissolving in case of any insoluble residue then is separated from the insoluble constituents of the residue. This separation of the resultant solution from possibly undissolved remaining constituents of the residue can be achieved, for example, by filtration and short re-washing of the residue with little water.

Thereafter, the solution or the separated solution, generally in the form of a filtrate is then heated to a temperature in the range of 40° C. to below the boiling point of the solution to form a hot solution, and preferably is heated up to 60° to about 80° C. To the hot solution is then added, preferably with stirring, an aqueous barium nitrate solution having an amount of barium ions which corresponds to a small excess of barium ions over the amount required stoichiometrically for a complete precipitation of the sulfate ions to form a reaction solution. Preferably, the barium nitrate solution has a concentration of barium nitrate in the range of 50 to 80 g/l. Care must be taken that the barium ions required for the sulfate precipitate are added only in a small excess, preferably in the range between 5 and 10 weight %. The resulting reaction solution is held at a selected temperature for a period of 0.5 to 2 hours to effect a well filtrating sulfate precipitate. Generally, the selected temperature is the same as the temperature of the hot solution in which is added the barium nitrate solution. Preferably, the barium nitrate solution is heated to this temperature before it is added to the hot solution. During the sulfate precipitation, the actinide sulfato complexes are decomposed and the sulfate ions formed are bound by the barium ions.

The reaction solution is then cooled to room temperature and the precipitate is separated out of the reaction solution, for example, by filtration. The precipitate can then be washed with relatively little pure water. The resultant precipitate free solution is free of sulfate ions and contains the entire amount of the actinides or of the actinides and cationic impurities of the waste as nitrate solution. The rate of recovery of the actinides previously contained in the residue is 99 weight % or above.

A particular advantage of the process according to the present invention can be seen in that it practically requires only one process step, and the resulting actinide nitrate solution without conducting further intermediate steps can be supplied to a suitable position of a reprocessing installation, where the fine purification of the actinide salts occurs in each case.

It is inconsequential for the process according to the present invention whether the resulting barium sulfate precipitate contains occlusions of any ions and how large the particles to be removed are; it is only necessary that they can be quickly and well filtrated. Because the barium sulfate precipitate is a neutral salt that is difficult to dissolve, and possibly contains incorporated radioactive impurities, it can be incorporated without further pre-treatment into a stable final storage matrix.

An exemplary experiment is described below to illustrate the invention.

10 kg of a simulated organic solid waste material (chlorine content about 30 weight %), consisting of 50 weight % polyvinylchloride, 25 weight % neoprene, 15 weight % polyethylene and 10 weight % chemical pulp which contained 120 g cerium dioxide for the simulation of the chemical behavior of plutonium dioxide, were mixed with 12 liters of concentrated sulfuric acid and treated according to the so-called wet combustion. A 50 g sample was removed from the filtrated residue of this process method and dissolved in 250 ml of water. The remaining insoluble residue amounted to only a small weight % (about 10%) and was separated by filtration.

10 ml of the filtrate was heated to about 60° C. and mixed with 60 ml of a 0.42 molar aqueous solution of barium nitrate in small portions likewise heated to about 60° C. A precipitate of barium sulfate thereby precipitated, which could easily be filtrated after maintaining the suspension about 1 hour at 60° C. A filtrate is obtained after the separation of the $BaSO_4$ which contained cerium ions in an amount that resulted in a yield of 99 weight %, based on the entire amount of added cerium.

It will be understood that the above description of the present invention is susceptible to various modifications, changes and adaptations, and the same are intended to be comprehended within the meaning and range of equivalents of the appended claims.

What is claimed is:

1. Process for the conversion into a usable condition of actinide ions contained in the solid residue of a sulfate reprocessing process for organic, actinide-containing radioactive solid waste, which are present in the form of water soluble sulfate complexes, the solid residue being one which can contain insoluble constituents, comprising:
    (a) dissolving the solid residue with water or 1 to 2 molar nitric acid so that the residue goes into the solution or the largest amount of the residue goes into the solution,
    (b) in the case where the solid residue contains insoluble constituents, separating the resulting solution from the insoluble constituents of the residue, and heating the solution or the separated solution to a temperature in the range of 40° C. to below the boiling point of the solution to form a hot solution,
    (c) adding to the hot solution an aqueous barium nitrate solution having an amount of barium ions which corresponds to a small excess of barium ions over the amount required stoichiometrically for complete precipitation of the sulfate ions, and holding the resulting reaction solution at a selected temperature in the same range as in step b) for a period in the range of 0.5 to 2 hours to precipitate barium sulfate,
    (d) subsequently cooling the reaction solution to room temperature and then separating the reaction solution from the barium sulfate precipitate to form a sulfate free actinide-nitrate aqueous solution, and
    (e) directly feeding without conducting further intermediate steps the sulfate free actinide-nitrate aqueous solution obtained after the separation to an aqueous nitric acid phase of an extractive reprocessing process of exposed nuclear fuel- and/or fertile materials.

2. Process according to claim 1, wherein several actinides are present in the solid residue and the sulfate free actinide-nitrate solution is fed into the aqueous phase before the uranium-plutonium-separation.

3. Process according to claim 1, wherein Pu is present in the solid residue and the sulfate free actinide-nitrate solution is fed into the aqueous phase before the first Pu-purification cycle.

4. The process according to claim 1, wherein U is present in the solid residue and the sulfate free actinide-nitrate solution is fed into the aqueous phase before the first U-purification cycle.

* * * * *